US 8,437,109 B1
May 7, 2013

(12) United States Patent
Wu

(10) Patent No.: US 8,437,109 B1
(45) Date of Patent: May 7, 2013

(54) POWER CLAMPING CIRCUIT WITH TEMPERATURE COMPENSATION

(75) Inventor: Zong-Yu Wu, Changhua County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 13/472,495

(22) Filed: May 16, 2012

(30) Foreign Application Priority Data

Jan. 6, 2012 (TW) .............................. 101100536 A

(51) Int. Cl.
*H02H 3/20* (2006.01)
(52) U.S. Cl.
USPC ....................................................... 361/91.1
(58) Field of Classification Search .................. None
See application file for complete search history.

(56) References Cited

U.S. PATENT DOCUMENTS

| 5,617,283 | A | * | 4/1997 | Krakauer et al. | ............... 361/56 |
| 5,786,972 | A | * | 7/1998 | Galipeau et al. | ................ 361/56 |
| 2006/0290415 | A1 | * | 12/2006 | Hazucha et al. | .............. 327/539 |
| 2007/0213946 | A1 | * | 9/2007 | Saether | ........................... 702/60 |

\* cited by examiner

*Primary Examiner* — Stephen W Jackson
*Assistant Examiner* — Terrence Willoughby
(74) *Attorney, Agent, or Firm* — Winston Hsu; Scott Margo

(57) ABSTRACT

A power clamping circuit with temperature compensation is disclosed. The power clamping circuit, for a system voltage, includes a first diode, a resistor with a positive temperature coefficient, a second diode, a comparator including a negative input terminal coupled to an anode of the first diode and a positive input terminal coupled to the resistor with the positive temperature coefficient, a transistor including a gate coupled to an output terminal of the comparator, a drain coupled to the system voltage and a source coupled to the ground, a first resistor, a second resistor, a third resistor, a fourth resistor, and a fifth resistor.

7 Claims, 4 Drawing Sheets

POWER CLAMPING CIRCUIT WITH TEMPERATURE COMPENSATION

BACKGROUND OF THE INVENTION

1. Field of the Invention

The present invention relates to a power clamping circuit with temperature compensation, and more particularly, to a power clamping circuit capable of generating a system voltage with a substantially zero temperature coefficient via adjusting a resistance ratio.

2. Description of the Prior Art

A traditional power clamping circuit may be a single Zener diode, or composed of several cascaded transistors. Please refer to FIG. 1A and FIG. 1B, which are schematic diagrams of two types of power clamping circuits 10 and 15. As shown in FIG. 1A, a cathode of a Zener diode VZ is coupled to a system voltage $V_{BAT}$, and an anode of the Zener diode VZ is coupled to a ground to form a reverse bias on the Zener diode VZ. As well known in the art, when the reverse bias, i.e. the system voltage $V_{BAT}$, is greater than a breakdown voltage of the Zener diode VZ, a breakdown current is generated on the Zener diode, and the breakdown current flows to the ground to decrease the reverse bias to be lower than the breakdown voltage. As a result, as long as the breakdown voltage of the Zener diode VZ is properly chosen, the system voltage $V_{BAT}$ may be limited to be lower than the breakdown voltage to achieve power clamping.

Similarly, as shown in FIG. 1B, the power clamping circuit 15 is composed of transistors $M_1$-$M_M$, when the system voltage $V_{BAT}$ is greater than a sum of threshold voltages $V_1$-$V_M$ of the transistors $M_1$-$M_M$, the transistors $M_1$-$M_M$ are turned on to decrease the system voltage $V_{BAT}$ to be lower than the sum of the threshold voltages $V_1$-$V_M$ to achieve power clamping.

However, the above traditional power clamping circuits are both susceptive to temperature. Thus, the breakdown voltage of the Zener diode varies with the temperature. Moreover, the threshold voltages $V_1$-$V_M$ of the transistor $M_1$-$M_M$ increase as the temperature decreases, i.e. a negative temperature coefficient. When the temperature is high, the transistors $M_1$-$M_M$ are easily turned on to perform the power clamping to the system voltage $V_{BAT}$. In other words, the system voltage $V_{BAT}$ may be much lower when the temperature is high, which may reduce an operating efficiency of a system load. Therefore, there is a need to improve the prior art to mitigate temperature influence on the power clamping circuit.

SUMMARY OF THE INVENTION

It is therefore an object of the present invention to provide a power clamping circuit with temperature compensation.

The present invention discloses a power clamping circuit with temperature compensation for a system voltage, including a first diode having an anode and a cathode, the cathode coupled to a ground, for generating a voltage with a negative temperature coefficient, a resistor with a positive temperature coefficient, a second diode having an anode coupled to the resistor with the positive temperature coefficient and a cathode coupled to the ground, a comparator having a negative input terminal coupled to the anode of the first diode and a positive input terminal coupled to the resistor with the positive temperature coefficient, a transistor having a gate coupled to an output terminal of the comparator, a drain coupled to the system voltage and a source coupled to the ground, a first resistor coupled to the system voltage, a second resistor coupled between the first resistor and the resistor with the positive temperature coefficient, a third resistor coupled between the first resistor and the anode of the first diode, a fourth resistor coupled between the positive input terminal of the comparator and the ground, and a fifth resistor coupled between the negative input terminal of the comparator and the ground.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
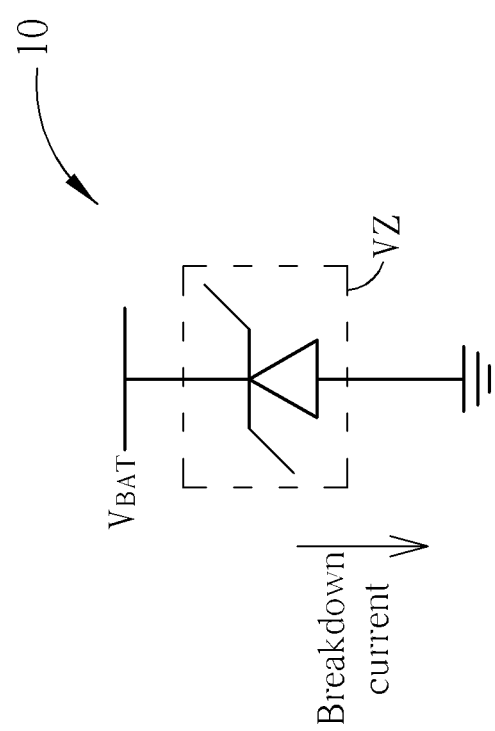
FIG. 1A is a schematic diagram of a traditional power clamping circuit.
Figure 1B:
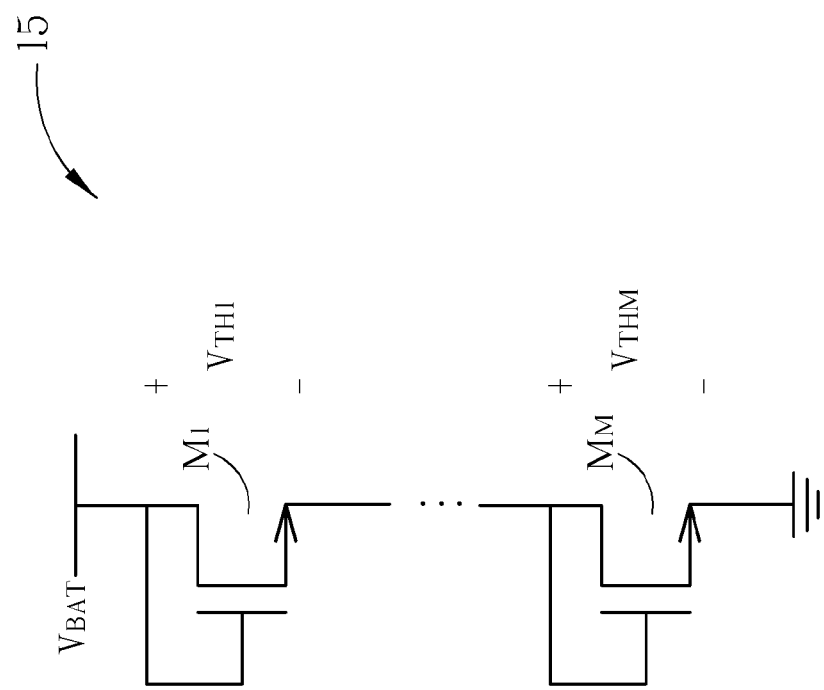
FIG. 1B is a schematic diagram of another traditional power clamping circuit.
Figure 2:
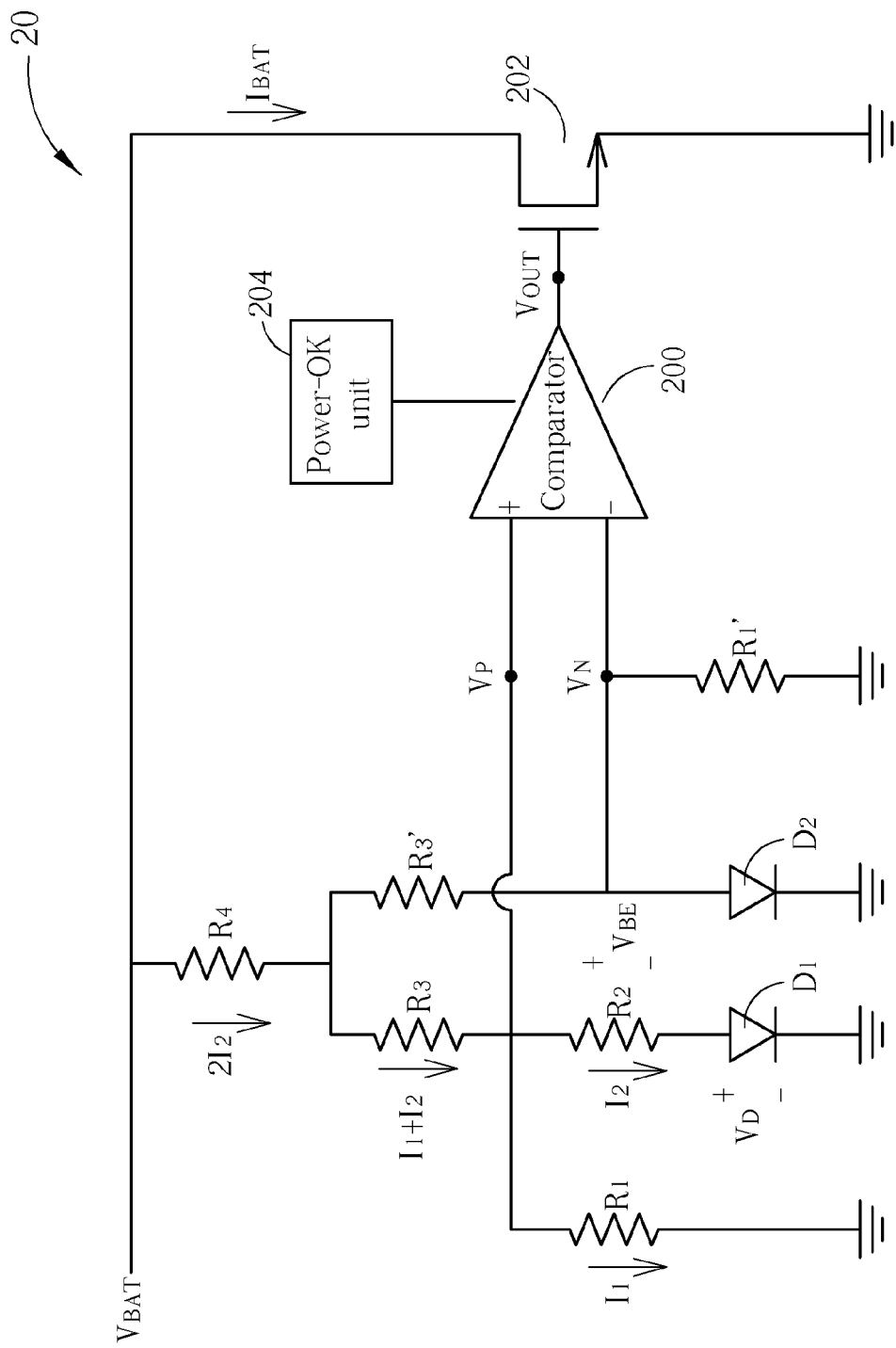
FIG. 2 is a schematic diagram of a power clamping circuit according to an embodiment of the present invention.

Please refer to FIG. 2, which is a schematic diagram of a power clamping circuit 20 according to an embodiment of the present invention. As shown in FIG. 2, the power clamping circuit 20 includes resistors $R_1$-$R_4$, $R_1'$ and $R_3'$, diodes $D_1$ and $D_2$, a comparator 200 and a transistor 202. The resistors $R_1'$, $R_3'$ have the same resistances of the resistors $R_1$, $R_3$, respectively. The comparator 200 may be an operational amplifier and may further include a power-OK unit 204 for ensuring an operation of the comparator 200 to avoid wrong action when a system voltage $V_{BAT}$ is relative low. Resistors have positive temperature coefficients, and diodes have negative temperature coefficients. Thus, a voltage or a current signal with a combination of positive and negative temperature coefficients may be obtained by cascading a resistor with a diode. In such a situation, the resistor $R_2$ is cascaded to the diode $D_1$ and coupled to a positive input terminal of the comparator 200, such that the positive input terminal of the comparator 200 receives a voltage $V_P$ having a combination of positive and negative temperature coefficients. The resistor $R_1'$ and the diode $D_2$ are coupled to a negative input terminal of the comparator 200, such that the negative input terminal of the comparator 200 receives a voltage $V_N$ having a combination of positive and negative temperature coefficients.

As a result, by properly selecting resistances of the resistors R1-R4, R1', R3' and emitter areas of the diode D1, D2, the positive and negative coefficients of the voltages $V_P$ and $V_N$ may be balanced or canceled, and the comparator 200 may compare the voltage $V_P$ with the voltage $V_N$ to perform power clamping. When system voltage $V_{BAT}$ is greater than a clamping voltage, the voltage $V_{OUT}$ may be used for turning on the transistor 202, such that an overcurrent $I_{BAT}$ on the system voltage $V_{BAT}$ flows through the transistor 202 to the ground to decrease the system voltage $V_{SAT}$, which achieves power clamping.

Noticeably, the power clamping circuit 20 is designed based on a bandgap circuit. Since the bandgap circuit has a feedback characteristic, the transistor 202 may be automatically turned on and off as the temperature and system voltage $V_{SAT}$ varies, so as to reach automatic power clamping. The following description illustrates the operation of the power clamping circuit 20 via detailed current and voltage analysis.

Assume that the resistor $R_2$ has a cross voltage $V_{BE}$, the diode $D_1$ has a cross voltage $V_D$, and the voltage $V_P$ is a sum of the cross voltages $V_{BE}$ and $V_D$, i.e. $V_P = V_{BE} + V_D$. Also assume that there are currents $I_1$-$I_4$ respectively flowing through the resistors $R_1$-$R_4$. According to the Ohm's Law, the currents $I_1$ and $I_2$ may be written as:

$$I_1 = \frac{V_{BE} + V_D}{R_1}, \quad I_2 = \frac{V_{BE}}{R_2} \tag{1}$$

In general, input impedances of the positive and negative input terminals of the comparator 200 are both much greater than the resistances of the resistors $R_1$-$R_4$, $R_1'$ and $R_3'$, thus, there is no current flowing into the positive and negative input terminals of the comparator 200, which makes the current $I_3$ on the resistor $R_3$ separately flow through the resistors $R_1$ and $R_2$ to the ground, i.e. $I_3 = I_1 + I_2$. Furthermore, the resistor $R_4$ is coupled between the system voltage $V_{BAT}$ and the resistors $R_3$ and $R_3'$, such that the current $I_4$ on the resistors $R_4$, separately flows through the resistors $R_3$ and $R_3'$. By properly selecting the resistances of the resistors $R_1$-$R_3$, $R_1'$ and $R_3'$, the current $I_4$ may evenly flow through the resistors $R_3$ and $R_3'$, i.e. $I_4 = 2(I_1 + I_2)$.

As a result, assuming that the system voltage $V_{BAT}$ of the power clamping circuit 20 is substantially equal to a clamping voltage $V_{REF}$, i.e. $V_{BAT} \cong V_{REF}$, and the clamping voltage $V_{REF}$ may be written as the following formula:

$$V_{REF} \cong V_D + V_{BE} + I_3 R_3 + I_4 R_4 \tag{2}$$

Substitute $I_3 = I_1 + I_2$ and $I_4 = 2(I_1 + I_2)$ into formula (2) and rewrite the clamping voltage $V_{REF}$:

$$V_{REF} \cong V_D + V_{BE} + (I_1 + I_2)(R_3 + 2R_4) \tag{3}$$

Then, substitute currents $I_1$ and $I_2$ of the formula (1) into formula (3) and rewrite the clamping voltage $V_{REF}$:

$$V_{REF} \cong V_D + V_{BE} + \frac{V_D + V_{BE}}{R_1} \cdot (R_3 + 2R_4) + \frac{V_{BE}}{R_2} \cdot (R_3 + 2R_4) \tag{4}$$

$$V_{REF} \cong V_D\left(1 + \frac{R_3 + 2R_4}{R_1}\right) + V_{BE}\left(1 + \frac{R_3 + 2R_4}{R_1} + \frac{R_3 + 2R_4}{R_2}\right)$$

As can be seen from formula (4), the clamping voltage $V_{REF}$ is a combination of the cross voltages $V_D$ and $V_{BE}$, wherein the cross voltage $V_{BE}$ has a positive temperature coefficient $T_{UBE}$ and the cross voltage $V_D$ has a negative temperature coefficient $T_{VD}$. Percentages of the cross voltage $V_D$ and $V_{BE}$ in the clamping voltage $V_{REF}$ may be adjusted by selecting the resistances of the resistors $R_1$-$R_4$, so as to compensate the temperature coefficients $T_{UBE}$ and $T_{VD}$ of the clamping voltage $V_{REF}$. In other words, the clamping voltage $V_{REF}$ with the substantially zero temperature coefficient may be obtained by summing the cross voltage $V_D$ and $V_{BE}$ with proper percentages. The temperature relation in formula (4) can be rewritten as:

$$(|T_{VD}|)\left(1 + \frac{R_3 + 2R_4}{R_1}\right) \cong (|T_{VBE}|)\left(1 + \frac{R_3 + 2R_4}{R_1} + \frac{R_3 + 2R_4}{R_2}\right) \tag{5}$$

Rearrange formula (5):

$$\frac{|T_{VD}|}{|T_{VBE}|} \cong \frac{1 + \frac{R_3 + 2R_4}{R_1} + \frac{R_3 + 2R_4}{R_2}}{1 + \frac{R_3 + 2R_4}{R_1}} \tag{6}$$

Assuming that a resistance ratio $K_1$ to be $$K_1 = \frac{R_3 + 2R_4}{R_2}$$

and a resistance ratio $K_2$ to be $$K_2 = \frac{R_3 + 2R_4}{R_1},$$

and formulas (4) and (6) can simplify as the following:

$$V_{REF} \cong V_D(1 + K_1) + V_{BE}(1 + K_1 + K_2) \tag{7}$$

$$\frac{|T_{VD}|}{|T_{VBE}|} \cong \frac{1 + K_1 + K_2}{1 + K_1} \tag{8}$$

In practice, the temperature coefficient $T_{VD}$ of the diode $D_1$ is substantially 10 times the temperature coefficient $T_{VBE}$ of the resistor $R_2$, i.e. $|T_{VD}| \cong 10|T_{VBE}|$, substitute the value into formula (8) and rearrange to know that $K_2 = 9K_1 + 9$. A threshold voltage of the diode $D_1$, i.e. the cross voltage $V_D$, is 0.7V, the cross voltage $V_{BE}$ is 0.055V. Use the above values in formula (7) to obtain the clamping voltage $V_{REF}$:

$$V_{REF} \cong 0.7(1+K_1) + 0.055(1+K_1+K_2) = 1.25 + 1.25 \cdot K_1 \tag{9}$$

Noticeably, as can be seen from formula (9), the clamping voltage $V_{REF}$ may be adjusted to a voltage equal or greater than 1.25V via adjusting the resistance ratio $K_1$. Assuming that the system voltage $V_{BAT}$ of the power clamping circuit 20 is 5V (i.e. $V_{BAT} = V_{REF} = 5V$) and the calculated resistance ratio $K_1 = 3$, $K_2 = 36$, the resistances of the resistor $R_1$-$R_4$ can be further calculated as shown in the Table:

| Resistor | Resistance (Unit: K ohm) |
|---|---|
| R1 | 96 |
| R2 | 8 |
| R3 | 64 |
| R4 | 112 |

Figure 3:
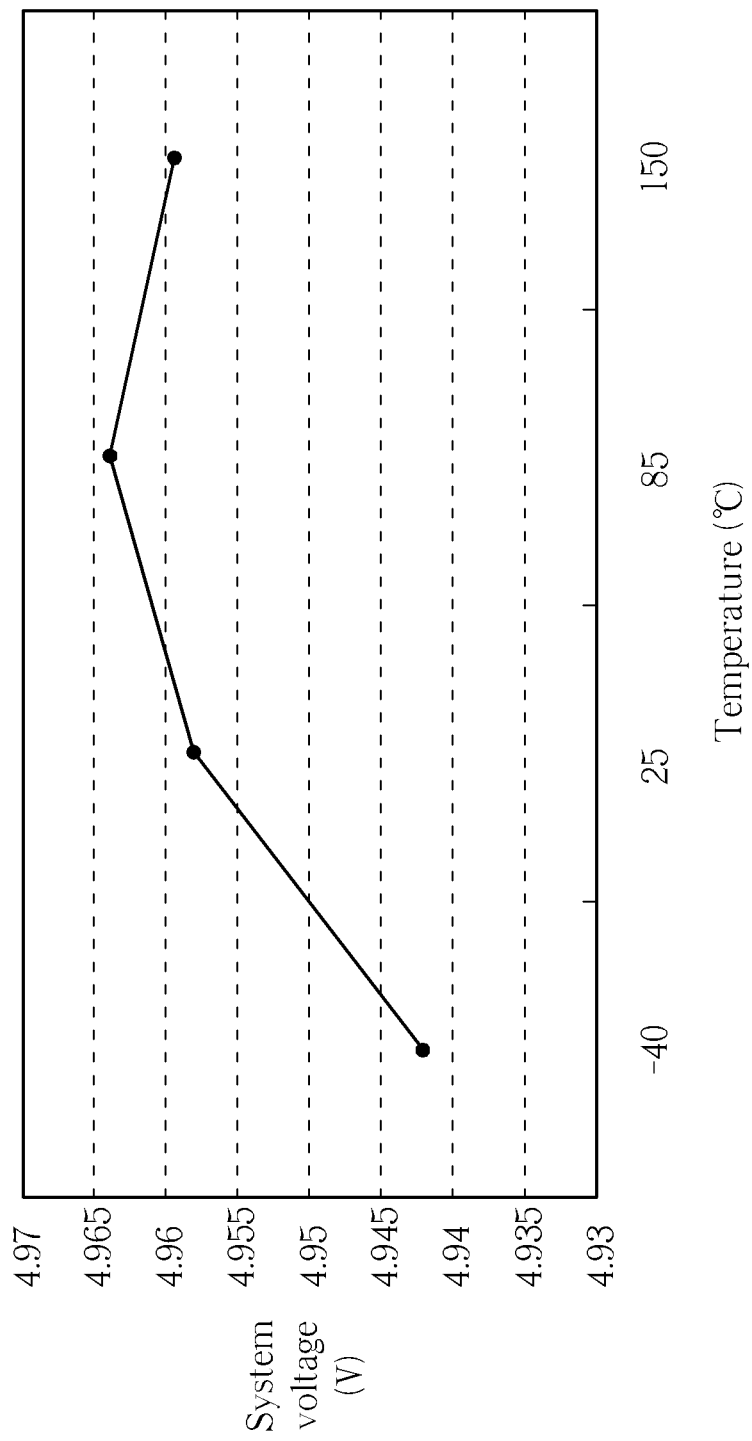
FIG. 3 is a schematic diagram of the system voltage of the power clamping circuit in FIG. 2 corresponding to different temperatures.

Then, use the resistances in the power clamping circuit 20 and simulate an output voltage, or the system voltage, of the power clamping circuit 20 corresponding to different temperatures. Please refer to FIG. 3, which is a schematic diagram of the system voltage $V_{BAT}$ of the power clamping circuit 20 corresponding to different temperatures. As shown in FIG. 3, when the temperature increases from −40 degrees Celsius to 150 degrees Celcius, the system voltage $V_{BAT}$ keeps around 4.94-4.96V, which is close to the predetermined 5V, and the system voltage $V_{BAT}$ varies only within 0.02V, or a 0.4% voltage variation. As a result, the power clamping circuit 20 may perform voltage stabilization to the system voltage $V_{BAT}$ regardless of the varying temperature to effectively achieve power clamping.

To sum up, the traditional power clamping circuit is deeply influenced by the temperature, and thus fails voltage stabilization under the varying temperature. In comparison, the power clamping circuit the of present invention adjusts the percentages of the positive and negative temperature coefficients voltage in the clamping voltage via properly selecting specific resistance ratios, to mitigate the temperature influence on the power clamping circuit. Furthermore, the resistance ratio is further used for determining the clamping voltage of the power clamping circuit, which broadens an application range of the power clamping circuit to suit for different requirements of different power systems as well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power clamping circuit with temperature compensation, for a system voltage, comprising:
    a first diode, including an anode and a cathode, the cathode coupled to a ground, for generating a voltage with a negative temperature coefficient;
    a resistor with a positive temperature coefficient;
    a second diode, including an anode coupled to the resistor with the positive temperature coefficient, and a cathode coupled to the ground;
    a comparator, including a negative input terminal coupled to the anode of the first diode and a positive input terminal coupled to the resistor with the positive temperature coefficient;
    a transistor, including a gate coupled to an output terminal of the comparator, a drain coupled to the system voltage and a source coupled to the ground;
    a first resistor, coupled to the system voltage;
    a second resistor, coupled between the first resistor and the resistor with the positive temperature coefficient;
    a third resistor, coupled between the first resistor and the anode of the first diode;
    a fourth resistor, coupled between the positive input terminal of the comparator and the ground; and
    a fifth resistor, coupled between the negative input terminal of the comparator and the ground.

2. The power clamping circuit of claim 1, wherein when a voltage at the positive input terminal of the comparator is greater than a voltage at the negative input terminal of the comparator, the output terminal of the comparator turns on the transistor, such that an overcurrent on the system voltage flows through the transistor to the ground.

3. The power clamping circuit of claim 1, wherein the resistor with the positive temperature coefficient is cascaded to the second diode to generate a voltage having the positive negative temperature coefficient, wherein the comparator compares the voltage having the positive negative temperature coefficient with the voltage having the negative temperature coefficient to cancel their temperature coefficients.

4. The power clamping circuit of claim 1, wherein a first ratio is composed of resistances of the first resistor, the second resistor and the resistor with the positive temperature coefficient.

5. The power clamping circuit of claim 4, wherein the first ratio determines a clamping voltage of the power clamping circuit.

6. The power clamping circuit of claim 1, wherein a second ratio is composed of resistances of the first resistor, the second resistor and the fourth resistor.

7. The power clamping circuit of claim 6, wherein the second ratio determines a clamping voltage of the power clamping circuit.

* * * * *